United States Patent [19]

Kawabe

[11] Patent Number: 4,733,120
[45] Date of Patent: Mar. 22, 1988

[54] FLAT TYPE STEPPING MOTOR

[75] Inventor: Eiji Kawabe, Iida, Japan

[73] Assignee: Tamagawa Seiki Kabushiki Kaisha, Tokyo, Japan

[21] Appl. No.: 65,887

[22] Filed: Jun. 24, 1987

[30] Foreign Application Priority Data

Jun. 27, 1986 [JP] Japan .................. 61-149485

[51] Int. Cl.$^4$ ............................................. H02K 5/04
[52] U.S. Cl. .................. 310/268; 310/49 R; 310/90; 310/156
[58] Field of Search ............... 310/49 R, 89, 90, 156, 310/162, 263, 268; 360/97

[56] References Cited

U.S. PATENT DOCUMENTS

| 4,429,240 | 1/1984 | Kishi | 310/268 |
| 4,581,667 | 4/1986 | Gerfast | 360/97 |
| 4,603,271 | 7/1986 | Maruyama | 310/268 |
| 4,645,963 | 2/1987 | Plackner et al. | 310/89 |
| 4,658,944 | 4/1987 | Kogure et al. | 360/97 |

FOREIGN PATENT DOCUMENTS

| 45995 | 11/1966 | German Democratic Rep. | 310/268 |
| 52-22706 | 2/1977 | Japan | 310/268 |
| 58-63226 | 10/1984 | Japan | 310/49 R |
| 1127821 | 9/1968 | United Kingdom | 310/268 |

Primary Examiner—Patrick R. Salce
Assistant Examiner—D. L. Rebsch
Attorney, Agent, or Firm—Brooks Haidt Haffner & Delahunty

[57] ABSTRACT

A flat type stepping motor used mainly for driving an ultra small size floppy disk is disclosed. According to the invention, a rotor yoke holder holding a pair of yokes on the rotor unit is secured to the end of a rotary shaft, while a stator unit is disposed radially outward of the rotor unit within the interior of the motor casing. The end of the rotor shaft is carried by a bearing unit, the end of which is introduced into the inside of the rotor yoke holder. The bearing unit and the rotor yoke holder are overlapped with each other in the axial direction of the stepping motor, to conserve axial space.

3 Claims, 2 Drawing Figures

FLAT TYPE STEPPING MOTOR

BACKGROUND OF THE INVENTION

1. Field of the Invention

This invention relates to a flat type stepping motor and more particularly to a flat ultra thin type floppy disk which is suited for rotationally driving an ultra small size floppy disk.

2. Related Art Statement

As the stepping motor having a hybrid type rotor employed in the prior art, the construction shown in FIG. 2 has been most typical, although the title of the literature is not shown herein specifically.

Referring to FIG. 2, the reference numeral 1 denotes a casing having a front cap 2 and a rear cap 3. Between these caps, there is provided a stator 6 consisting essentially of a stator core 4 and a winding 5.

The stator 6 in the form of a ring in a plan view is formed by a plurality of teeth and a winding provided in the inside of the casing 1.

A pair of bearing holding units 7, 8 are provided at either end along the center axis of the casing 1, these units holding a first bearing unit 9 and a second bearing unit 10, respectively. A corrugated washer 11 is disposed between the second bearing unit 10 and the rear cap 3.

A rotary shaft 12 is mounted for rotation by the bearing units 9 and 10. The one end of the rotary shaft 12 is passed through and extended outwardly of a through-hole 7a in the bearing holding unit 7.

At about the center of the rotary shaft 12 are mounted first and second rotor yokes 13, 14 formed as disks, while a ring-like magnet 15 is clamped between these rotor yokes 13 and 14. A rotor generally indicated at 16 is made up of the rotor yokes 13, 14 and the magnet 15.

A first spacer 17 is arranged between the first bearing unit 9 and the first rotor yoke 13 while a second spacer 18 is provided between the second rotor yoke 14 and the second bearing unit 10.

The above described conventional flat type stepping motor operates in such a manner that, in the state of FIG. 2, drive pulses are applied to the winding 5 provided to the stator 6, so that the rotor 16, magnetized to a plurality of magnetic poles, is driven in a stepwise rotation by a predetermined angle each time the driving pulse is applied.

In the above described construction of the conventional stepping motor, since the rotor 16 is sandwiched between the pair of spacers 17 and 18, it has been extremely difficult to reduce the axial thickness so as to provide a flat type motor. Thus the lower limit of the motor thickness of approximately 10 mm cannot be exceeded by reducing the size of the component parts.

On the other hand, 8-inch size floppy disks are now being used in the word processor applications in preference to the 5-inch size floppy disks. The prospect is that 2-inch and 1-inch size floppy disks will be offered to the market in the near future. In association therewith, it is demanded that a stepping motor with a thickness of 7 mm be developed in place of the currently used version with a thickness of 10 mm. Such a demand cannot be fulfilled with the aforementioned prior-art construction of the stepping motor.

SUMMARY OF THE INVENTION

It is an object of the present invention to provide a flat ultra thin type stepping motor that is able to obviate the forementioned problem while satisfying the above demand.

According to the present invention, there is provided a flat type stepping motor comprising a casing having a bearing holding unit, a pair of bearing units mounted within said bearing unit, a rotary shaft mounted for rotation by said bearing units, a rotor yoke holder secured to an end of said rotary shaft, a pair of rotor yokes mounted on the outer periphery of said rotor yoke holder, a magnet mounted between said rotor yokes, and a stator unit mounted in association with said rotor yokes and said magnet within the interior of said casing, wherein an improvement resides in that the end of said bearing holding unit is introduced into said rotor yoke holder and that the bearing holding unit and the rotor yoke holder are overlapped with each other in the axial direction of the motor.

According to the present invention, since the end of the bearing holding unit is introduced into the inside of the rotor yoke holder, and the letter is axially overlapped with the bearing holding unit, the thickness in the radial direction of the bearing holding unit and the rotor yoke holder in the axial direction is significantly reduced. Thus it is possible with the flat stepping motor of the present invention to realize the thin type motor with a thickness of 7 mm which is well below the thickness of 10 mm that could be realized with the conventional system.

DESCRIPTION OF PREFERRED EMBODIMENTS

A preferred embodiment of the flat type stepping motor according to the present invention will be described in detail by referring mainly to FIG. 1 of the accompanying drawing. It will be noted that the same numerals are used to depict the parts the same as or equivalent to those of the above described prior-art device.

Figure 1:
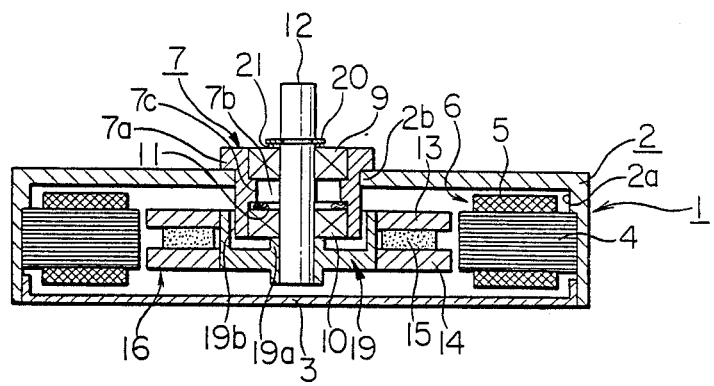
FIG. 1 is a sectional view of a flat type stepping motor according to the present invention.
Figure 2:
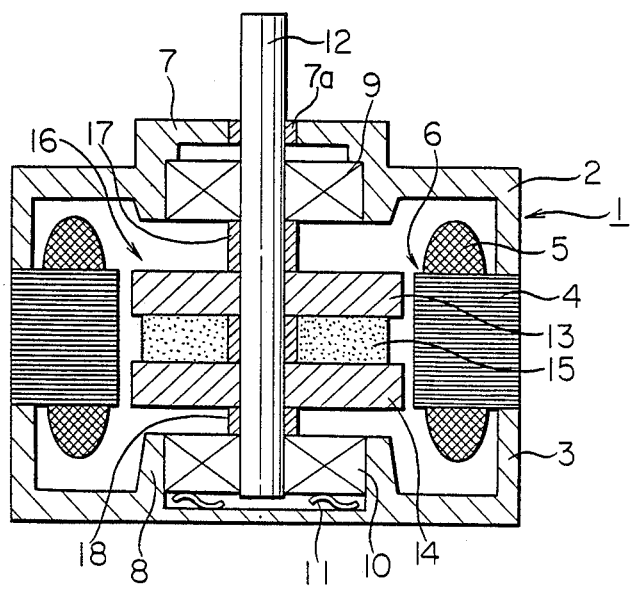
FIG. 2 is a sectional view of a conventional stepping motor.

FIG. 1 shows in cross section a flat type stepping motor according to the present invention. In this figure, the numeral 1 denotes a generally cylindrical casing including a bottom casing 2 and a cover 3. A stator 6 including a stator core 4 and a winding 5 is disposed within the confines of an inner peripheral wall 2a of the bottom casing 2.

In an opening 2b formed at the center axis of the bottom casing 2 is fitted and secured a generally cylindrical bearing holding unit 7. The unit 7 has an end flange 7a abutting on an opening edge 2c of the bottom casing 2 for positioning.

Within a hollow interior 7b defined within the bearing holding unit 7, a first bearing unit 9 and a second bearing unit 10 are disposed at a small spacing interval from each other. The first bearing unit 9 abuts on a step portion 7c of the unit 7 while a washer 11 is disposed between the step portion 7c and the second bearing unit 10.

A rotary shaft 12 is carried for rotation by the bearing units 9 and 10. To the lower end of the rotary shaft 12 is securely mounted a rotor yoke holder 19 having a substantially U-shaped cross section. A shank portion 19a formed at the center of the rotor yoke holder 19 abuts on the second bearing unit 10 which is held in position by the washer 11 and the shank portion 19a.

To the outer periphery of a cylindrical wall section 19b of the rotor yoke holder 19 are fixedly mounted a pair of ring-like magnets 15 axially magnetized to N and S poles, sandwiched between these rotor yokes 13 and 14. The rotor yoke holder 19, rotor yokes 13, 14 and the magnets 15 make up a rotor unit 16.

An E-ring 20 is attached to a portion of the rotary shaft 12 while a washer 21 is provided between the E-ring 20 and the first bearing unit 9.

The flat type stepping motor of the present invention operates in such a manner that, as an electrical voltage is applied by driving pulses across the winding 5 provided on the stator 6, the rotor unit 16 is driven in a stepwise rotation by a prescribed angle each time the voltage is applied by the combined action of the magnetic fluxes produced by the magnet and the magnetomotive force produced in the winding 5.

What is claimed is:

1. A flat type stepping motor comprising a casing (1) having a bearing holding unit (7), a pair of bearing units (9, 10) mounted within said bearing holding unit (7), a rotary shaft (12) mounted for rotation in said bearing units (9, 10), a rotor yoke holder (19) secured to an end of said rotary shaft (12), a pair of rotor yokes (13, 14) mounted on the outer periphery of said rotor yoke holder (19), a magnet (15) mounted between said rotor yokes (13), (14), and a stator unit (6) mounted in operative association with said rotor yokes (13, 14) and said magnet (15) within the interior of said casing (1), characterized in that the end of said bearing holding unit (7) is introduced into the interior of said rotor yoke holder (19) and in that said bearing holding unit (7) and the rotor yoke holder (19) are overlapped with each other in the axial direction of the motor.

2. A flat type stepping motor according to claim 1 characterized in that said bearing holding unit (7) and said rotor yoke holder (19) are generally cylindrical in shape.

3. A flat type stepping motor according to claim 1 characterized in that said bearing holding unit (7) has a step portion (7c), and a washer (11) is positioned between said step portion (7c) and said one bearing unit (10).

* * * * *